Oct. 20, 1953     N. J. ROSENBURGH     2,656,186
DOCUMENT STRAIGHTENING MEANS FOR
PHOTOGRAPHIC COPYING APPARATUS
Filed Dec. 29, 1950     2 Sheets-Sheet 1
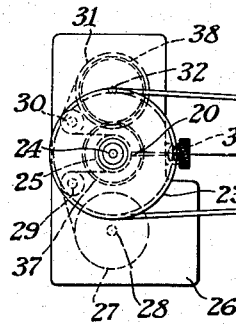
FIG. 1.
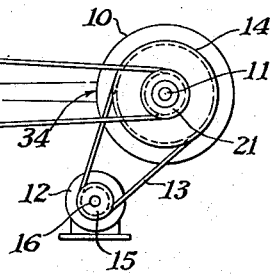
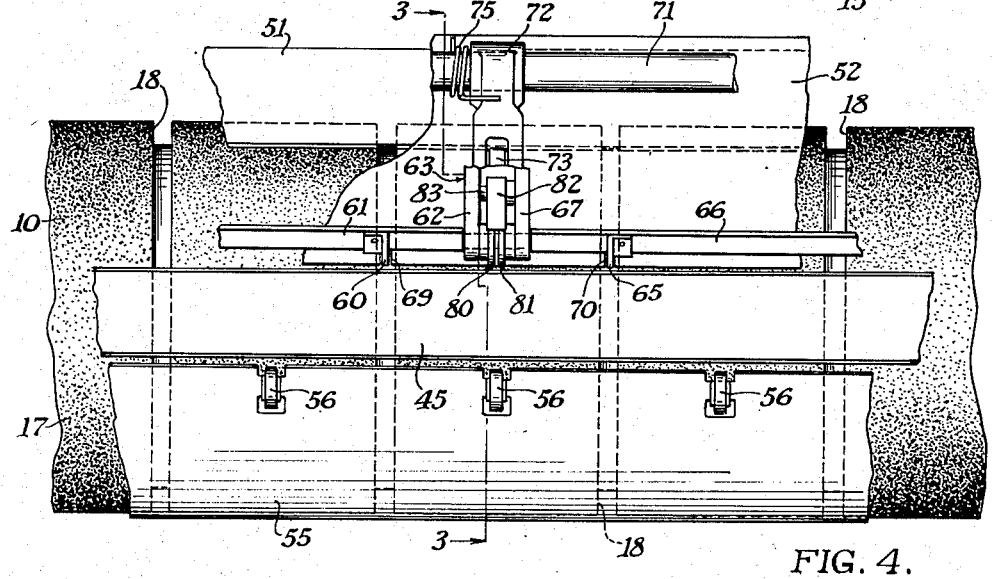
FIG. 2.
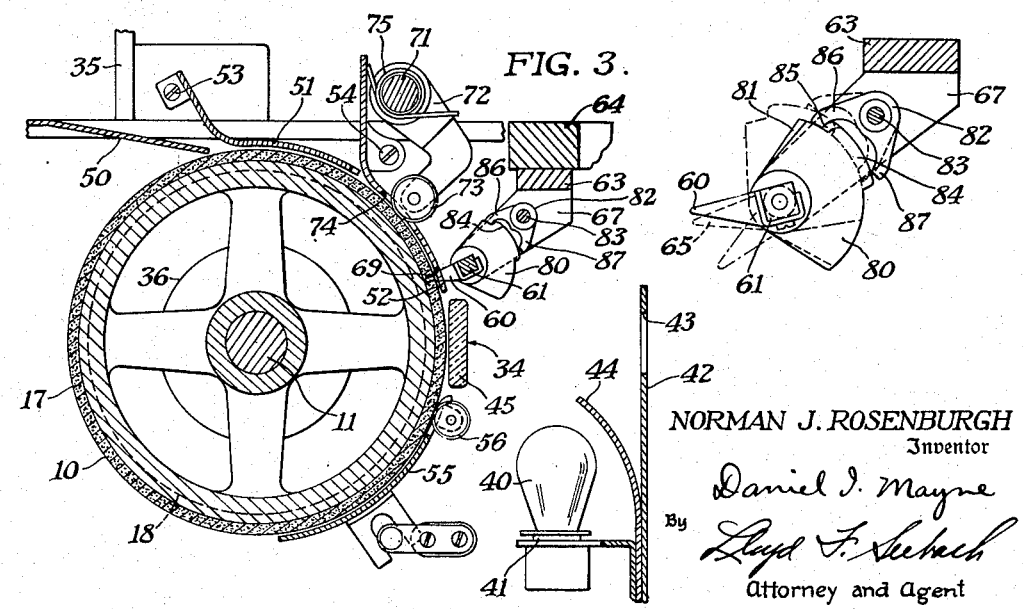
FIG. 3.    FIG. 4.
NORMAN J. ROSENBURGH
Inventor
By Daniel J. Mayne
Lloyd F. Seebach
Attorney and Agent Oct. 20, 1953  N. J. ROSENBURGH  2,656,186
DOCUMENT STRAIGHTENING MEANS FOR
PHOTOGRAPHIC COPYING APPARATUS
Filed Dec. 29, 1950  2 Sheets-Sheet 2

NORMAN J. ROSENBURGH
Inventor

By Daniel J. Mayne
Lloyd F. Seebach
Attorney and Agent

Patented Oct. 20, 1953

2,656,186

UNITED STATES PATENT OFFICE 2,656,186

DOCUMENT STRAIGHTENING MEANS FOR PHOTOGRAPHIC COPYING APPARATUS

Norman J. Rosenburgh, Rochester, N. Y., assignor to Eastman Kodak Company, Rochester, N. Y., a corporation of New Jersey Application December 29, 1950, Serial No. 203,342

10 Claims. (Cl. 271—53)

This invention relates to photographic copying apparatus and more particularly to an arrangement for orienting discrete sheets or documents fed into such apparatus, the invention being applicable to apparatus in which the document is moved through the photographic field in either an arcuate or a straight path.

The use of a plurality of fingers and a roller in contact with a document-conveying drum for straightening documents or sheets, as disclosed in U. S. Patent No. 1,908,845, issued to R. S. Hopkins on May 16, 1933, is well known. In such an arrangement, the document, when fed into the apparatus in other than a properly oriented position, is delayed until the central portion of the document is moved forward sufficiently to square the document with the straightening fingers arranged transversely of the document path. It has been found, however, when documents such as War Bonds, ledger cards, etc., are fed against the straightening fingers, that documents of such weight tend to displace the fingers before the document is properly oriented. As a result, the document image is not squarely aligned on the film and there is also the possibility that a portion of the leading or trailing end of the document will not be photographed.

This disadvantage has been overcome in the present invention by dividing the transversely spaced straightening fingers into two groups which are independently mounted and independently rotatable. To prevent displacement of the fingers from their document or sheet halting position, the two groups of fingers are interconnected by an escapement mechanism which is released to permit displacement of the fingers only when the leading edge of the document is in contact with both groups of fingers. This arrangement has been found to insure proper orientation of documents irrespective of their weight.

The primary object of the invention, therefore, is to provide in a photographic copying apparatus a document or sheet feeding means embodying an improved means for properly orienting documents when fed into such photographic copying apparatus in other than a properly oriented position.

Another object of the invention is to provide in a photographic copying apparatus a document or sheet feeding means comprising two groups of fingers which are spaced and arranged transversely of the document path and an escapement mechanism for holding said fingers in a document halting position and for releasing said fingers only when the leading edge of a document contacts both groups of fingers.

Still another object of the invention is to provide in a photographic copying apparatus a document or sheet feeding means in which two groups of document straightening fingers are arranged transversely of the document path for delaying the advance of the leading corner of a document until the escapement mechanism maintaining said fingers in their document halting position is released by the leading edge of the document being moved against both groups of fingers with substantially equal force.

And yet another object of the invention is to provide in a photographic copying apparatus a document or sheet feeding means in which two groups of straightening fingers are maintained by an escapement means in a document halting position and released from said position only upon engagement of both of said groups of fingers by the leading edge of the document and in which means is provided for engaging both groups of fingers upon release thereof to provide unitary movement of said fingers by the document.

Other objects and advantages will be apparent to those skilled in the art by the description which follows.

The objects of the invention are embodied in a photographic copying apparatus comprising an advancing means adapted to receive and move a discrete sheet through a photographic station, means cooperating with said advancing means for orienting said sheet prior to its advance through said photographic station, said means comprising two groups of aligned fingers spaced transversely of the path of said sheet, each group of fingers being independently rotatable and biased into a position to halt the advance of the foremost portion of a sheet received in other than an oriented position, and means cooperating with said advancing means and one of said group of fingers for rotating said sheet into an oriented position and for moving said sheet against said fingers, and an escapement means adapted to engage both of said groups of fingers for maintaining said fingers in said sheet halting position and for releasing said fingers only when said sheet is properly oriented and exerts substantially equal force on each group of said fingers.

The word "orient," as used in the following description of the invention and in the appended claims, is to be read as meaning to cause something to take place, or assume a desired position relative to some object or base. In the present invention, a document is properly oriented when its leading or forward edge is perpendicular to the direction of document movement or parallel to the axis of the rotating drum which moves it through the photographic field.

Reference is now made to the accompanying drawing wherein like reference numerals designate like parts, and wherein:

Fig. 1 is a schematic side elevation of a photographic copying device;

Fig. 2 is a front elevation of the central portion of the rotating drum and the elements associated therewith which comprise the present invention;

Fig. 3 is a vertical section taken substantially on line 3—3 of Fig. 2 and showing the relation of the straightening fingers with respect to the straightening roller and photographic station;

Fig. 4 is a detail side elevation of the escapement mechanism and showing the mechanism in its holding and released positions;

Figure 5:
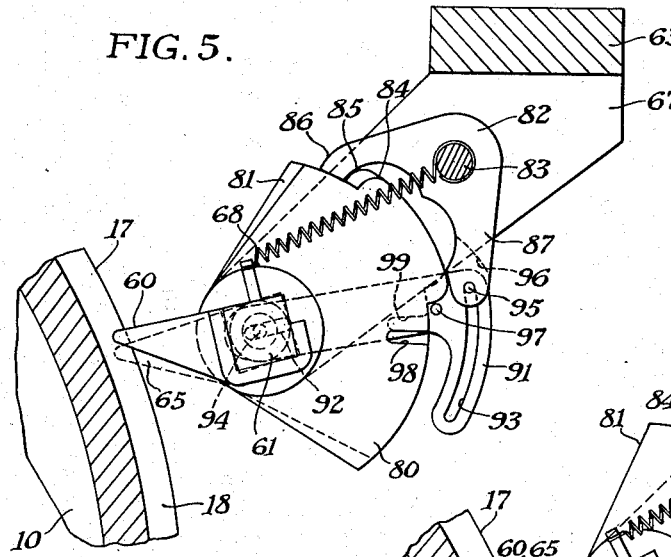
Figure 6:
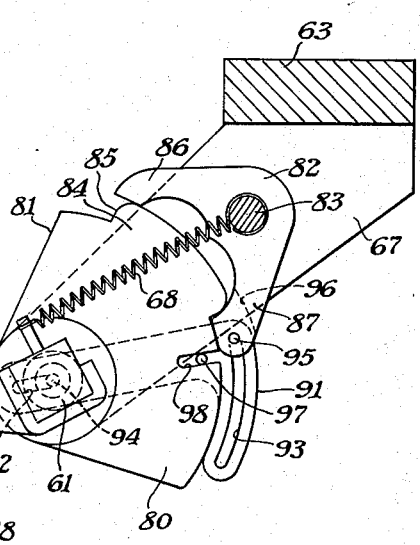
Figure 8:
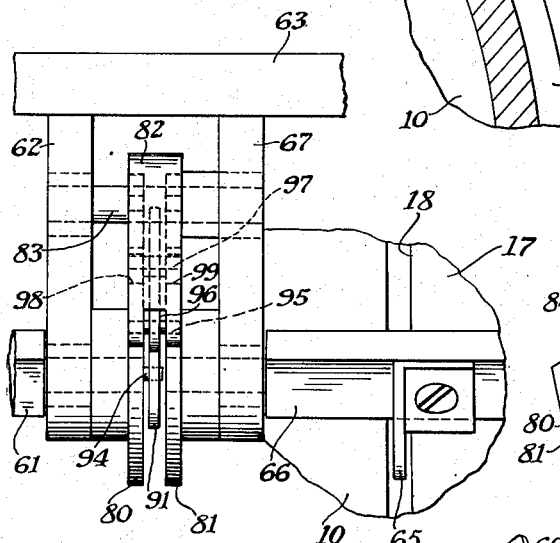
Figure 7:
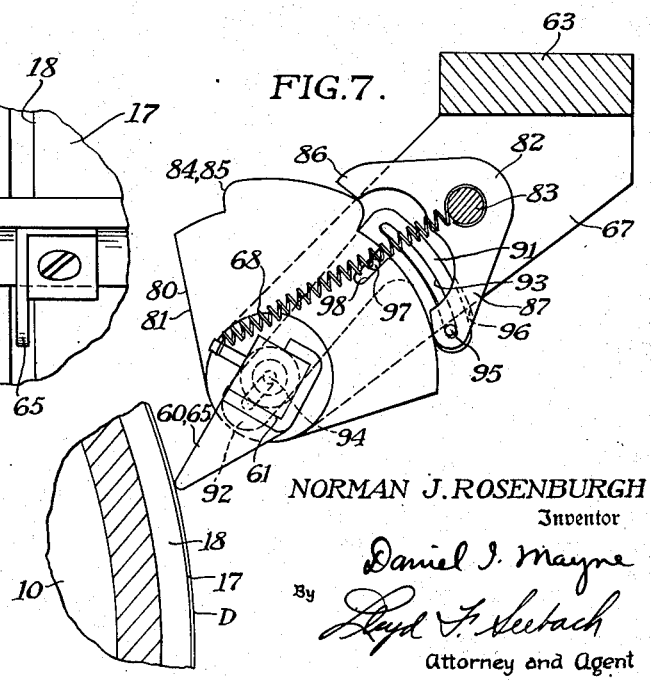

Figs. 5, 6 and 7 are detail side elevations of another embodiment of the invention in which the two groups of fingers are locked together and showing, respectively, the relation of the elements when a corner of a document has been moved against one of the two groups of fingers, when the leading edge of the document has released the escapement pallet and the two groups of fingers are interconnected, and when the fingers have been moved into a fully displaced position by the document; and Fig. 8 is a detail front elevation of the elements in the position disclosed in Fig. 7.

Similar to other document recording apparatus, the apparatus disclosed includes a feeding station, a photographic field or station, an exposure station, an advancing means for moving documents through the photographic field and a film strip through the exposure station in synchronism, and a clutch means between the document and film drives. The clutch means is similar to that disclosed in U. S. Patent No. 1,976,346, issued to C. J. Hughey on October 9, 1934.

The advancing means is similar to that disclosed in U. S. Patent No. 1,957,889, issued to R. S. Hopkins et al. on May 8, 1934. Such a feeding means may include a feeding drum 10 which is mounted on shaft 11 and which is driven by motor 12 through chain or belt 13 encircling sprockets or pulleys 14 and 15 on shaft 11 and motor shaft 16, respectively. Drum 10 is provided with an outer layer 17 of material having a high coefficient of friction, such as cork, and with a plurality of spaced circumferential grooves 18, as shown in Fig. 2.

The advancing means, see Fig. 1, for moving the light-sensitive material continuously through an exposure station 20 comprises sprocket 21 fixed to shaft 11 and connected by an endless chain 22 to sprocket 23 on shaft 24 which, in turn, is connected in any suitable manner to film drive roller 25 within the film unit 26. Film unit 26 is preferably of the type disclosed in the aforementioned Hopkins patent and includes a supply reel 27 mounted on spindle 28, a pair of guide rollers 29 and 30, and a take-up reel 31 mounted on spindle 32. The film path in such a film unit is from supply reel 27, around guide roller 29, around film roller 25, around guide roller 30 and to the take-up reel 31. An objective lens member 33 is mounted in the front wall of film unit 26 and has optical characteristics corresponding to the distance between the photographic field, as designated by numeral 34, and exposure station 20 on roller 25. The limiting rays through the objective for the photographic field and exposure station are indicated by broken lines in Fig. 1.

The feed drum 10 is mounted between side frames 35, only one of which is shown in Fig. 3, and the drive from motor 12 is transmitted through a clutch means, designated broadly by the numeral 36, on shaft 11, as disclosed in the above-mentioned Hughey patent. The clutch arrangement accomplishes the connection between the feeding means for the document and the advancing means for the film strip so that sprocket 21, sprocket 23, roller 25 and take-up reel 31 are rotated. The ratio between sprockets 21 and 23 and gears 37 and 38, which connect take-up spindle 32 with the film drive shaft 24, may be readily determined so that the light-sensitive material is advanced in synchronism with the movement of the document through the photographic field.

The illuminating means comprises a bank of lamps 40 which are in two groups and connected in parallel circuit. Lamps 40 are mounted in line and parallel to the axis of drum 10 on bracket 41 secured to partition 42 which is provided with an aperture 43. A reflector 44 is mounted on partition 42 for reflecting as much of the stray light as possible toward the photographic field 34, at which station the document is moved under glass plate 45.

The feeding station comprises a plate 50, as shown in Fig. 3, which is mounted between frame members 35 and upon which a document or sheet is moved forward into engagement with drum 10. The document is guided to the photographic field by the formed plates 51 and 52 which are secured to frame members 35 at 53 and 54, respectively. Plate 55, in which rollers 56 are rotatably mounted, guides the document from the photographic field to a suitable receptacle.

The document straightening means comprises two groups of fingers, which are independently mounted and independently rotatable, and a rotatable member which cooperates with drum 10 to properly orient a document which is fed onto said drum in other than a properly oriented manner. A group of fingers 60 are spaced transversely along shaft 61 which has one end journaled in frame 35 and the other end journaled in the leg 62 of the U-shaped bracket 63 secured centrally of horizontal tie rod 64 extending between frame members 35, see Figs. 2 and 3. A second group of fingers 65 are spaced transversely along shaft 66 which has one end journaled in frame 35 and the other end journaled in leg 67 of bracket 63. Both groups of fingers are spaced along their respective shafts in accordance with the spacing of grooves 18 and are biased to enter into said grooves by springs 68, as shown in Figs. 5-7. As shown in Figs. 2 and 3, it will be noted that fingers 60 and 65 extend through slots 69 and 70, respectively, in plate 52, are positioned above the photographic field to contact the forward edge of a document before it enters the photographic field and are adapted to be displaced from grooves 18 by a document passing thereunder. The strength of springs 68 is so adjusted that the bias imparted to the fingers through shafts 61 or 66 cannot be overcome to displace fingers 60 or 65 from grooves 18 by the pressure of the document acted upon solely by the friction of drum 10.

A shaft 71, which is journaled in frame members 35, has a bracket 72 fixedly mounted thereon, said bracket rotatably supporting a metal roller 73 which extends through an aperture 74 in plate 52 and contacts drum 10. Roller 73 is biased into contact with drum 10 by the coil spring 75 encircling shaft 71, as shown in Fig. 2, is rotatable by drum 10, and functions to engage the surface of the document to press it into contact with drum 10. It will be noted that roller 73 is located ahead of fingers 60 and 65, i. e., between said fingers and the feeding station, and is positioned axially near the center of drum 10.

The escapement means, see Figs. 3 and 4, comprises an escapement plate or cam 80 secured to the end of shaft 61, an escapement plate or cam 81 secured to the end of shaft 66, and an escapement pallet 82 pivotally mounted on pin 83 in bracket 63, said cams and pallet being arranged between legs 62 and 67 of bracket 63, as shown in Fig. 2. Cams 80 and 81 have actuating portions 84 and 85 which are adapted to engage the arms 86 and 87 of pallet 82. From Fig. 2 it will be noted that cams 80 and 81 are adjacent each other and that pallet 82 is of such width as to engage both cams simultaneously. The normal position of fingers 60 and 65 is determined by slots 69 and 70 in plate 52, said fingers being yieldingly held thereagainst by springs 68.

With reference to Figs. 2-4, when a document is moved along plate 50 and into engagement with drum 10 in a properly oriented position, it will be moved by drum 10 under roller 73 and against both groups of fingers 60 and 65. As long as the document is properly oriented when the leading edge strikes fingers 60 and 65 simultaneously, the roller 73 will cooperate with drum 10 to move the document with substantially equal force against both groups of fingers. Since cams 80 and 81 are fixed to shafts 61 and 66, respectively, the cams will be rotated with the fingers as the force of the document is exerted thereagainst so that the actuating portions 84 and 85 will strike arm 86 and rock pallet 82 to permit rotation of said cams under the pallet and to permit the document to displace the fingers from grooves 18 as the document is moved toward the photographic field. In other words, as long as the leading edge of a document is properly oriented and engages both groups of fingers simultaneously, the escapement mechanism offers no resistance to the movement of the document.

However, when the document is not properly oriented, the escapement mechanism delays advancement of the document until it has been properly oriented. If it is assumed with respect to Fig. 2 that the right-hand corner of the document is ahead of the left corner, the right-hand portion of the leading edge will then strike fingers 65 causing the fingers and cam 81 to rotate slightly until portion 85 strikes arm 86. Pallet 82, however, will not be rocked to a releasing position because arm 87 in engagement with actuating portion 84 of cam 80 prevents movement thereof. Fingers 65, therefore, are maintained in their document halting position by cam 81 and arm 86 of pallet 82, the relation of fingers 65 to fingers 60 being indicated by the broken line position shown in Fig. 4. Roller 73 then cooperates with drum 10 to pivot the document counter-clockwise about a point under roller 73 until the leading edge is also moved into engagement with fingers 60. Fingers 60 are then rotated slightly until they assume a position identical with that of fingers 65, at which time actuating portion 84 of cam 80 will also abut arm 86 of pallet 82. Since the leading edge then contacts both groups of fingers, further movement of the document by roller 73 and drum 10 will cause actuating portions 84 and 85 of cams 80 and 81 to exert sufficient force against arm 86 to rock pallet 82 and release both groups of fingers for displacement from grooves 18. The function of the escapement mechanism is exactly the same if the document is not properly oriented in the other direction, that is, if the left-hand corner is introduced ahead of the right-hand corner so that the left hand portion of the leading edge first engages fingers 60. In either case, the fingers 60 and 65 cannot be released by the escapement mechanism until the document is properly oriented.

In Figs. 5-8, another embodiment of the invention is disclosed in which cams 80 and 81 are locked together for unitary movement upon release of the escapement mechanism by the leading edge of the document when in engagement with both groups of fingers. In this arrangement, an L-shaped intermediate member 91 is provided with an elongated slot 92 and an arcuate slot 93. Member 91 is pivotally mounted on an extension 94 of shaft 61 between cams 80 and 81, see Fig. 8, and is pivotally connected to arm 87 of pallet 82 by pin 95 and movable through slot 96 in arm 87. Pin 97 extending either side of member 91 is adapted to engage the slots 98 and 99 in cams 80 and 81, respectively, for connecting the groups of fingers 60 and 65 in a manner about to be described.

In the same manner as previously described, when a properly oriented document is moved by drum 10 toward the fingers 60 and 65, said fingers and cams 80 and 81 are rotated slightly, which places slots 98 and 99 in the position of slot 99 as shown in Fig. 5. As the cams are rotated still farther, the pallet is rocked out of its blocking position by actuating portions 84 and 85 which moves member 91 radially inward so that pin 97 engages slots 98 and 99 to interconnect or lock both groups of fingers together, as shown in Fig. 6. Continued movement of the document displaces both groups of fingers from grooves 18, and cams 80 and 81 and member 91 are moved together with fingers 60 and 65 as a complete unit to a position as shown in Fig. 7. Fingers 60 and 65, therefore, are interconnected only upon release of pallet 82 which occurs only when the leading edge of the document engages both groups of fingers.

When the document is not properly oriented, the leading edge first strikes fingers 65, assuming that the right-hand corner of the document as viewed from Fig. 2 is the leading corner, to rotate said fingers and cam 81 slightly and positioning slot 99 very nearly under pin 97. However, since fingers 60 have not yet been engaged by the document, cam 80 will prevent pin 97 from entering slot 99. With the halting of the document by fingers 65, roller 73 and drum 10 cooperate to rotate the document in a counterclockwise direction until the leading edge engages fingers 60 and slightly rotates said fingers until they are aligned with fingers 65. Pallet 82 is then rocked by actuating portions 84 and 85 and member 91 is moved radially inward by arm 87 so that pin 97 is moved into engagement with slots 98 and 99 thereby locking both groups of fingers together for movement as a single unit upon displacement of said fingers from grooves 18 by the leading edge of the document. When the trailing edge of the document moves from under fingers 60 and 65, springs 68 return said fingers and cams to their original document halting position. As cams 80 and 81 are rotated in a counterclockwise direction by said springs, the actuating portions 84 and 85 strike arm 87 to rock pallet 82 in a counterclockwise direction thereby causing pin 95 to move member 91 radially outward to disengage pin 97 from slots 98 and 99. The groups of fingers are thereby disengaged and positioned against slots 69 and 70 to locate the fingers in the path of the succeeding document. The escapement mechanism is released in exactly the same manner by a document which is not properly oriented in the other direction, that is, if the left-hand corner is introduced ahead of the right-hand corner so the left-hand portion of the leading edge first engages fingers 60.

While in the foregoing description of the invention the document is described as being fed toward the straightening means and thence to an operating position or photographic field by a drum, or in an arcuate path, the invention is also applicable to sheets or documents which must be fed in a vertical or horizontal path to any such position in a properly oriented state. Consequently, it is not intended that the invention be limited to the apparatus described inasmuch as, in view of the disclosure, obvious modifications and uses, other than in connection with photographic apparatus, will be readily suggested to those skilled in the art without departing from the spirit of the invention or the scope of the appended claims.

Having now particularly described my invention, what I desire to secure by Letters Patent of the United States and what I claim is:

1. In an apparatus of the character described, advancing means adapted to receive and move a discrete sheet through an operating station, means cooperating with said advancing means for orienting said sheet prior to its advance through said station, said means comprising two groups of aligned fingers spaced transversely of the path of said sheet, each group of fingers being independently rotatable and biased into a position to halt the advance of the foremost portion of a sheet received in other than an oriented position, and means cooperating with said advancing means and one of said groups of fingers for rotating said sheet into an oriented position and for moving said sheet against said fingers, escapement cams operatively connected to each of said groups of fingers and movable therewith, and an escapement pallet adapted to engage said cams for maintaining said fingers in said sheet halting position and for releasing said cams simultaneously to permit said fingers to be displaced from said position upon engagement of both of said groups of fingers by the leading edge of said sheet.

2. In an apparatus of the character described, advancing means adapted to receive and move a discrete sheet through an operating station, means cooperating with said advancing means for orienting said sheet prior to its advance through said station, said means comprising two groups of aligned fingers spaced transversely of the path of said sheet, each group of fingers being independently rotatable and biased into a position to halt the advance of the foremost portion of a sheet received in other than an oriented position, and means cooperating with said advancing means and one of said groups of fingers for rotating said sheet into an oriented position and for moving said sheet against said fingers, an escapement cam positioned near the center of the sheet path, operatively connected to one of said groups of fingers and movable therewith, a second escapement cam positioned near the center of the sheet path and adjacent said first-mentioned cam, operatively connected to the other of said groups of fingers, and movable therewith, an escapement pallet adapted to engage said cams for preventing any one group of fingers from being displaced by the foremost portion of a sheet when received in other than an oriented position and for releasing said cam members simultaneously to permit said fingers to be displaced from said position upon engagement of both of said groups of fingers by the leading edge of said sheet.

3. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and ahead of said fingers in the direction of document travel for engaging said document and for cooperating with one of said groups of fingers to orient said document, and an escapement means operatively connected to said groups of fingers and operative to release said fingers for displacement from said grooves by said document only when the leading edge of said document simultaneously contacts both of said groups of fingers.

4. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and ahead of said fingers in the direction of document movement for engaging said document and for cooperating with one of said groups of fingers to orient said document, escapement cams operatively connected to each of said groups of fingers and movable therewith, and an escapement pallet adapted to engage each cam for preventing any one group of fingers from being displaced from said grooves by the foremost portion of a document when received in other than an oriented position and for releasing said cams simultaneously to permit said fingers to be yieldingly displaced from said grooves by said document upon engagement of both of said groups of fingers by the leading edge of said document.

5. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and ahead of said fingers in the direction of document movement for engaging said document and for cooperating with one of said groups of fingers to orient said document, an escapement cam positioned near the center of the document path, operatively connected to one of said groups of fingers, and movable therewith, a second escapement cam positioned near the center of the document path and adjacent said first-mentioned cam, operatively connected to the other of said groups of fingers, and movable therewith, an escapement pallet adapted to engage said cams for preventing any one group of fingers from being displaced by the foremost portion of a document when received in other than an oriented position and for releasing said cams simultaneously to permit said fingers to be displaced from said grooves upon engagement of both of said groups of fingers by the leading edge of said document.

6. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and ahead of said fingers in the direction of document movement for engaging said document and for cooperating with one of said groups of fingers to orient said document, an escapement cam having an actuating portion and positioned near the center of the document path, operatively connected to one of said groups of fingers and movable therewith, a second escapement cam having an actuating portion and positioned near the center of the document path adjacent said first-mentioned cam, operatively connected to the other of said groups of fingers, and movable therewith, an escapement pallet having two spaced arms for engaging said cams, one of said arms being positioned in the path of said actuating portions by the other arm in engagement with said actuating portions for preventing any one group of fingers from being displaced by the foremost portion of a document when received in other than an oriented position and movable by said actuating portions upon engagement of both of said groups of fingers by the leading edge of said document to a position for releasing said cam members simultaneously to permit displacement of said fingers from said grooves by said document.

7. In an apparatus of the character described, advancing means adapted to receive and move a discrete document through a photographic field, means cooperating with said advancing means for orienting said document prior to its advance through said photographic field, said means comprising two groups of aligned fingers spaced transversely of the path of said sheet, each group of fingers being independently rotatable and biased into a position to halt the advance of the foremost portion of a document received in other than an oriented position, and means cooperating with said advancing means and one of said groups of fingers for rotating said sheet into an oriented position and for moving said sheet against said fingers, an escapement means operatively connected to said groups of fingers and operative to release said fingers from their document halting position only when the leading edge of said document simultaneously contacts both of said groups of fingers, and means adapted to engage said groups of fingers upon release thereof to provide unitary movement of said groups of fingers by said document.

8. In an apparatus of the character described, advancing means adapted to receive and move a discrete sheet through a photographic station, means cooperating with said advancing means for orienting said sheet prior to its advance through said photographic station, said means comprising two groups of aligned fingers spaced transversely of the path of said sheet, each group of fingers being independently rotatable and biased into a position to halt the advance of the foremost portion of a sheet received in other than an oriented position, and means cooperating with said advancing means and one of said groups of fingers for rotating said sheet into an oriented position and for moving said sheet against said fingers, an escapement cam positioned near the center of the sheet path, operatively connected to one of said groups of fingers, and movable therewith, a second escapement cam positioned near the center of the sheet path and adjacent said first-mentioned cam, operatively connected to the other of said groups of fingers, and movable therewith, an escapement pallet adapted to engage said cams for preventing any one group of fingers from being displaced by the foremost portion of a sheet when received in other than an oriented position and for releasing said cam members simultaneously to permit said fingers to be displaced from said position upon engagement of both of said groups of fingers by the leading edge of said sheet, and an intermediate member pivotally mounted between said escapement cams for movement about the axis of rotation of said fingers and with respect to said escapement pallet and including a member adapted to engage said escapement cams upon release thereof for locking said groups of fingers together to provide unitary movement thereof by said document.

9. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and ahead of said fingers in the direction of document movement for engaging said document and for cooperating with one of said groups of fingers to orient said document, an escapement cam secured to each of said groups of fingers for movement therewith and positioned adjacent each other, an escapement pallet adapted to engage each cam for preventing any one group of fingers from being displaced from said grooves by the foremost portion of a document when received in other than an oriented position and for releasing said cams simultaneously to permit said fingers to be yieldingly displaced from said grooves by said document upon engagement of both of said groups of fingers by the leading edge of said document, and means pivotally mounted between said cams and adapted to engage said cams upon release thereof to provide unitary movement of said fingers by said document.

10. In an apparatus of the character described, a continuously rotating drum adapted to receive and advance discrete documents through a photographic field, a plurality of spaced circumferential grooves in said drum, a feeding station for introducing documents onto said drum, a document straightening means including a group of fingers spaced axially of said drum, a second group of fingers spaced axially of said drum and aligned with said first-mentioned group of fingers, both of said groups of fingers being arranged above said photographic field and biased to enter into said grooves, and a member axially positioned near the center of said drum and head of said fingers in the direction of document movement for engaging said document and for cooperating with one of said groups of fingers to orient said document, an escapement cam having an actuating portion and positioned near the center of the document path, operatively connected to one of said groups of fingers, and movable therewith, a second escapement cam having an actuating portion and positioned near the center of the document path adjacent said first-mentioned cam, operatively connected to the other of said groups of fingers, and movable therewith, an escapement pallet having two spaced arms for engaging said cams, one of said arms being positioned in the path of said actuating portions by the other arm in engagement with said actuating portions for preventing any one group of fingers from being displaced by the foremost portion of a sheet when received in other than an oriented position and movable by said actuating portions upon engagement of both of said groups of fingers by the leading edge of said document to a position for releasing said cam members simultaneously to permit displacement of said fingers from said grooves by said document, and an intermediate member pivotally mounted between said escapement cams for movement about the axis of rotation of said fingers and with respect to said escapement pallet and including a member adapted to engage said escapement cams upon release thereof for locking said groups of fingers together to provide unitary movement thereof by said document.

NORMAN J. ROSENBURGH.

References Cited in the file of this patent

UNITED STATES PATENTS

| Number | Name | Date |
| --- | --- | --- |
| 1,908,845 | Hopkins | May 16, 1933 |
| 2,373,503 | Sager et al. | Apr. 10, 1945 |
| 2,428,769 | Bobst | Oct. 14, 1947 |